United States Patent [19]

Furuta et al.

[11] 4,420,051

[45] Dec. 13, 1983

[54] WEIGHING APPARATUS

[75] Inventors: Mitsuru Furuta; Takeo Nakashimizu, both of Shiga, Japan

[73] Assignee: Kabushiki Kaisha Ishida Koki Seisakusho, Kyoto, Japan

[21] Appl. No.: 308,547

[22] PCT Filed: Jan. 26, 1981

[86] PCT No.: PCT/JP81/00017

§ 371 Date: Oct. 1, 1981

§ 102(e) Date: Oct. 1, 1981

[87] PCT Pub. No.: WO81/02204

PCT Pub. Date: Aug. 6, 1981

[30] Foreign Application Priority Data

Feb. 1, 1980 [JP] Japan ................................. 55-11615

[51] Int. Cl.³ ..................... G01G 19/22; G01G 13/00; G01G 19/00; B65G 37/00
[52] U.S. Cl. ........................................ 177/25; 177/52; 177/145; 198/473; 198/504
[58] Field of Search ......................... 177/25, 1, 52–56, 177/145; 198/504, 472, 473, 680

[56] References Cited

U.S. PATENT DOCUMENTS

| 285,663 | 9/1883 | Pearce | 198/472 |
| 2,716,479 | 8/1955 | Coder et al. | 198/680 |
| 3,997,013 | 12/1976 | Brook | 177/52 |
| 4,163,488 | 8/1979 | Brook | 177/52 X |
| 4,308,928 | 1/1982 | Oshima | 177/25 |
| 4,344,492 | 8/1982 | Hirano | 177/165 X |

Primary Examiner—George H. Miller, Jr.
Attorney, Agent, or Firm—Armstrong, Nikaido, Marmelstein & Kubovcik

[57] ABSTRACT

A weighing apparatus which has a plurality of lines for conveying and weighing including means for continuously conveying a group of articles to be weighed, and which are thrown in either automatically or manually, means for sequentially weighing the group of articles on the means for conveying, means for storing the weight values of the group of articles in predetermined numbers in each conveying and weighing line, means for adding any of, or a predetermined different combination of, the stored weight values, and means for discriminating the set weight nearest to the set weight. This weighing apparatus can automatically weigh even articles which cannot be automatically supplied.

8 Claims, 5 Drawing Figures

WEIGHING APPARATUS

The present invention relates to a weighing apparatus, which uses combinational analysis and a transfer systems of simple mechanisms, thereby making it possible to automatically weigh not only objects which can be automatically fed and weighed but also other objects which it has heretofore been impossible to automatically weigh because they cannot be automatically fed, the intention being to provide a preset weight value or a value nearest thereto.

To this end, the invention provides a weighing apparatus comprising a plurality of transfer and weighing lines each consisting of a bucket conveyor having a plurality of buckets for transferring objects to be weighed, and a weighing unit for weighing the buckets with objects held therein, said apparatus being adapted to drive the bucket conveyors to successively weigh the objects held in the buckets, store a predetermined number of measured weight values of the objects for each transfer and weighing line, and compute a desired or predetermaned number of combinations of the stored weight values to obtain a combination which provides a preset weight value or a value nearest thereto.

According to the invention, not only objects which can be automatically fed and automatically weighed can be automatically weighed but also other objects which it has heretofore been impossible to automatically weigh because they cannot be automatically fed, can be automatically weighed by manually feeding them. Further, a target weight or a weight nearest thereto can be obtained in a short time by electronic circuitry, while the objects which have not taken part in the optimum combination can be weighed again to be used in other combinational computations, thereby increasing the computational capacity. As compared with this type of conventional weighing apparatus based on combinational computation, the number of weighers required is only $\frac{1}{2}$ to $\frac{1}{3}$ as large and the large-sized pool hopper and weighing hopper are dispensed with, so that the entire apparatus is simple.

This and other objects and features of the invention will become more apparent from the following description taken in conjunction with the accompanying drawings. In the drawings.

Figure 1:
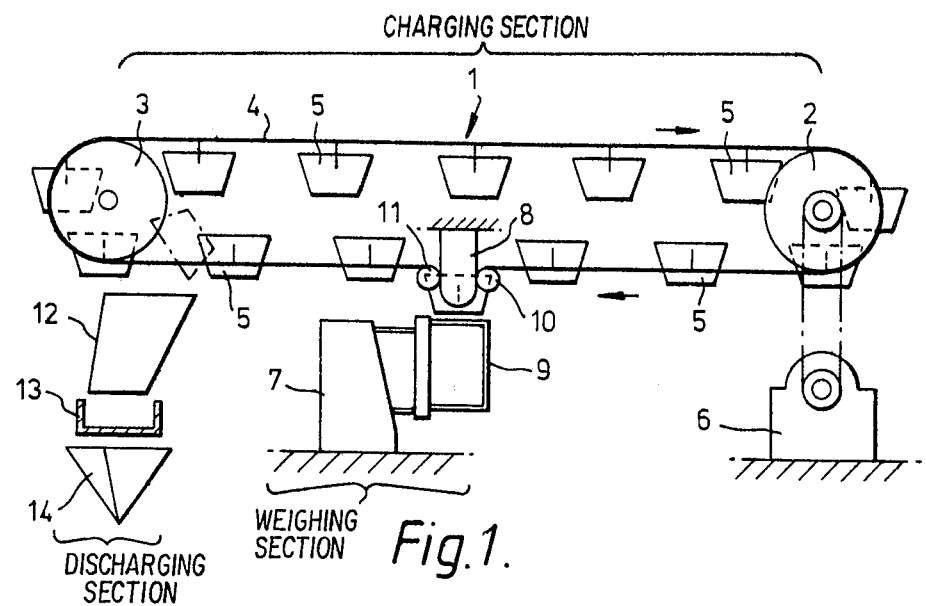
FIG. 1 is a schematic elevational side view of a weighing apparatus according to an embodiment of the present invention.

In FIG. 1, the numeral 1 denotes a bucket conveyor having a number of buckets 5 attached to a pair of roller chains 4 meshing with driving and driven sprocket wheels 2 and 3. The numeral 6 denotes a drive motor for the bucket conveyor 1. The numeral 7 denotes a weighing unit for weighing objects fed into the buckets 5, disposed below the bucket conveyor 1. The numeral 8 denotes guide plates for guiding the buckets 5 to the weighing pan 9 of the weighing unit 7 so as to place them on said weighing pan, with sprocket wheels 10 and 11 of small diameter disposed on opposite sides of said weighing pan, the arrangement being such that the roller chains 4 move horizontally and then around the sprocket wheels 10 to descend along the guide plates 8 and then they ascend along the guide plates 8 until they return to their horizontal travel, as will be later described. The numeral 12 denotes a discharge chute disposed below the end of the bucket conveyor 1; the numeral 13 denotes a collecting conveyor; and 14 denotes a timing hopper. As will be later described, it is so arranged that after combinational computations of the weight values of objects weighed by the weighing unit 7 have been made, the buckets containing the objects corresponding to the combination providing the preset weight value or a value nearest thereto are tipped above the discharge chute 12 as shown in phantom line by a bucket tipping mechanism (not shown), so that the objects are discharged through the discharge chute 12 onto the collecting conveyor 13 and then into the timing hopper 14.

Figure 2:
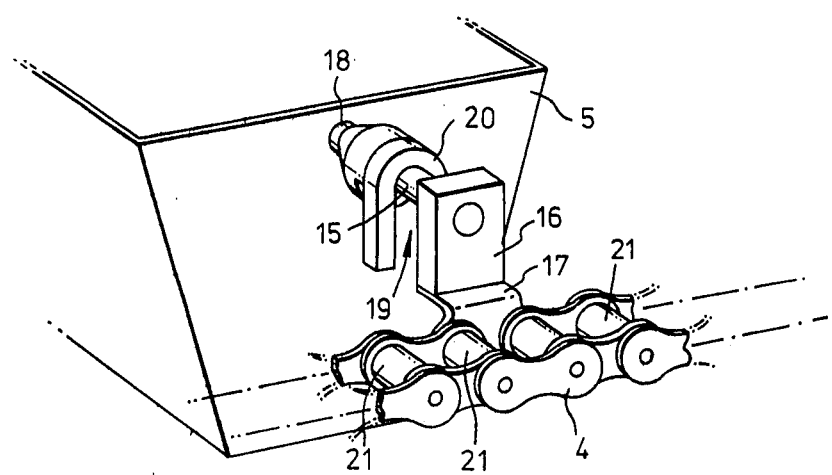
FIG. 2 is a fragmental perspective view of a bucket conveyor shown in FIG. 1.

The buckets 5 of the bucket conveyor 1 are attached to the roller chains 4 in the manner shown in FIG. 2. Thus, an attaching element 16 having an attaching shaft 15 fixed thereto is vertically fixed to an L-shaped bracket 17 fixed to the roller chain 4, while a bucket shaft 18 is fixed to a lateral surface of the bucket 5. An inverted U-shaped attaching bracket 20 having elongated opening 19 formed therein is suspendedly fixed to said bucket shaft 18 and the attaching shaft 15 is inserted in said elongated opening 19. The attaching shaft 15 and bucket shaft 18 are aligned with each other. The above arrange-ment is also provided on the opposite lateral surface of the bucket 5. In this way, the buckets 5 are attached to the pair of roller chains 4 (see FIG. 4).

Figure 3:
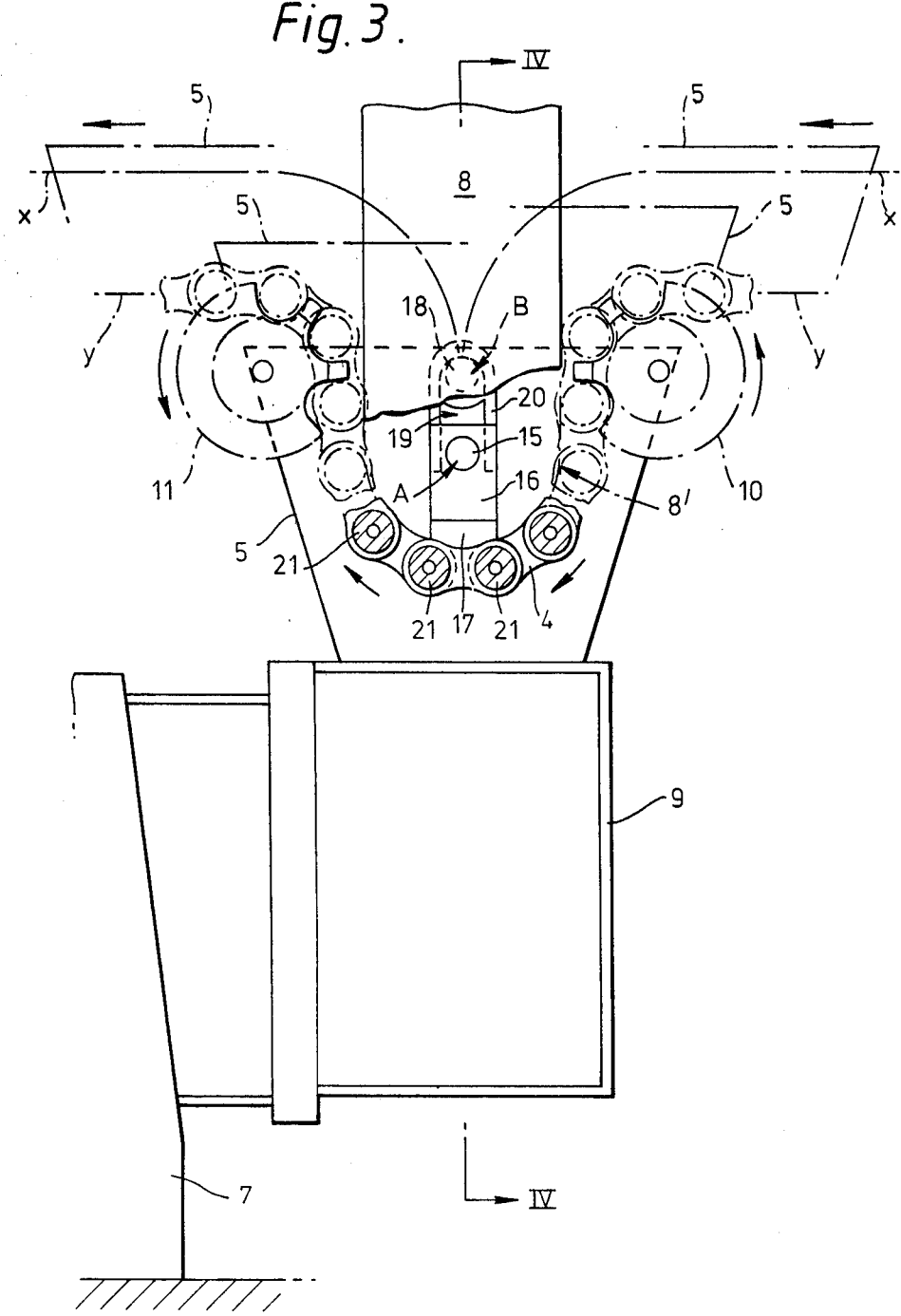
FIG. 3 is an enlarged view of a portion of FIG. 1, showing means for placing buckets on a weighing unit.
Figure 4:
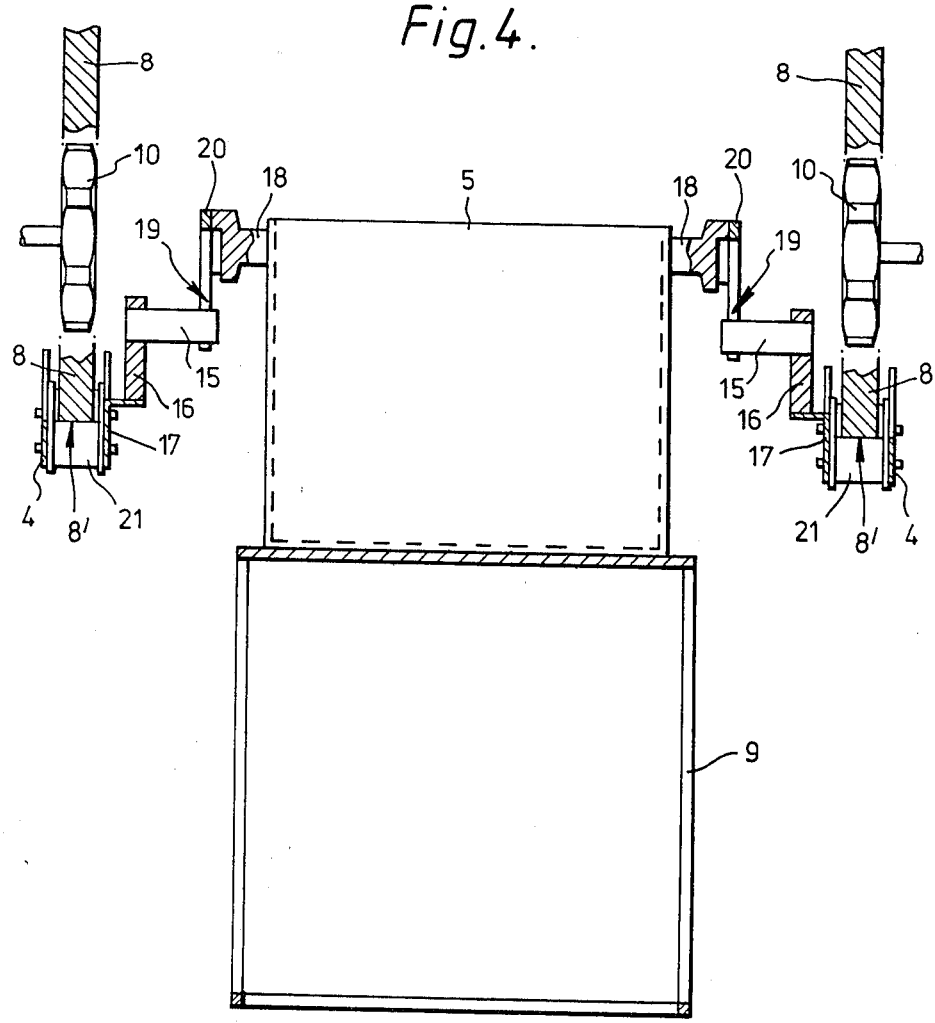
FIG. 4 is a section taken along the line IV—IV of FIG. 3.

A concrete arrangement for successively placing the buckets 5 on the weighing pan 9 of the weighing unit 7 will now be described with reference to FIGS. 3 and 4. The lower end of each guide plate 8 is semicircular and the sprocket wheels 10 and 11 of the same diameter are disposed close thereto and on a level with each other. The guide plate 8 and sprocket wheels 10 and 11 are disposed in the same vertical plane so that the rollers 21 of the roller chain 4 are in contact with and roll on the peripheral surface 8′ of the guide plate 8. The guide plate 8 and sprocket wheels 10 and 11 are installed on each side of the path of travel of the buckets 5, as shown in FIG. 4. In addition, in FIG. 3, the character y indicates the path of travel of the roller chain 4 and x indicates the path of travel of the attaching shaft 15. A point A is the lowest point of travel of the attaching shaft 15 and is fixed and a point B is the lowest point of travel of the bucket shaft 18, said point B vertically varying with the weight of objects to be measured.

A plurality of transfer and measuring lines (hereinafter referred to briefly as the lines) each comprising, as described above, the bucket conveyor 1 composed of the driving and driven sprocket wheels 2 and 3 and a number of buckets 5, the weighing unit 7, the discharge chute 12, and the guide plates 8 and sprocket wheels 10 and 11 for successively placing the buckets 5 on the weighing pan 9 of the weighing unit 7 are installed side by side and the bucket conveyors 1 are driven by the motor 6, each line operating by successively measuring the objects held in the buckets 5, storing a predetermined number of weight values, computing combinations of any suitable number of predetermined number of stored weight values, and discharging the objects corresponding to the preset weight value or a value nearest thereto onto the collecting conveyor 13 through the discharge chute 12 and then into the timing hopper 14, thereby collecting the objects at a single place.

Figure 5:
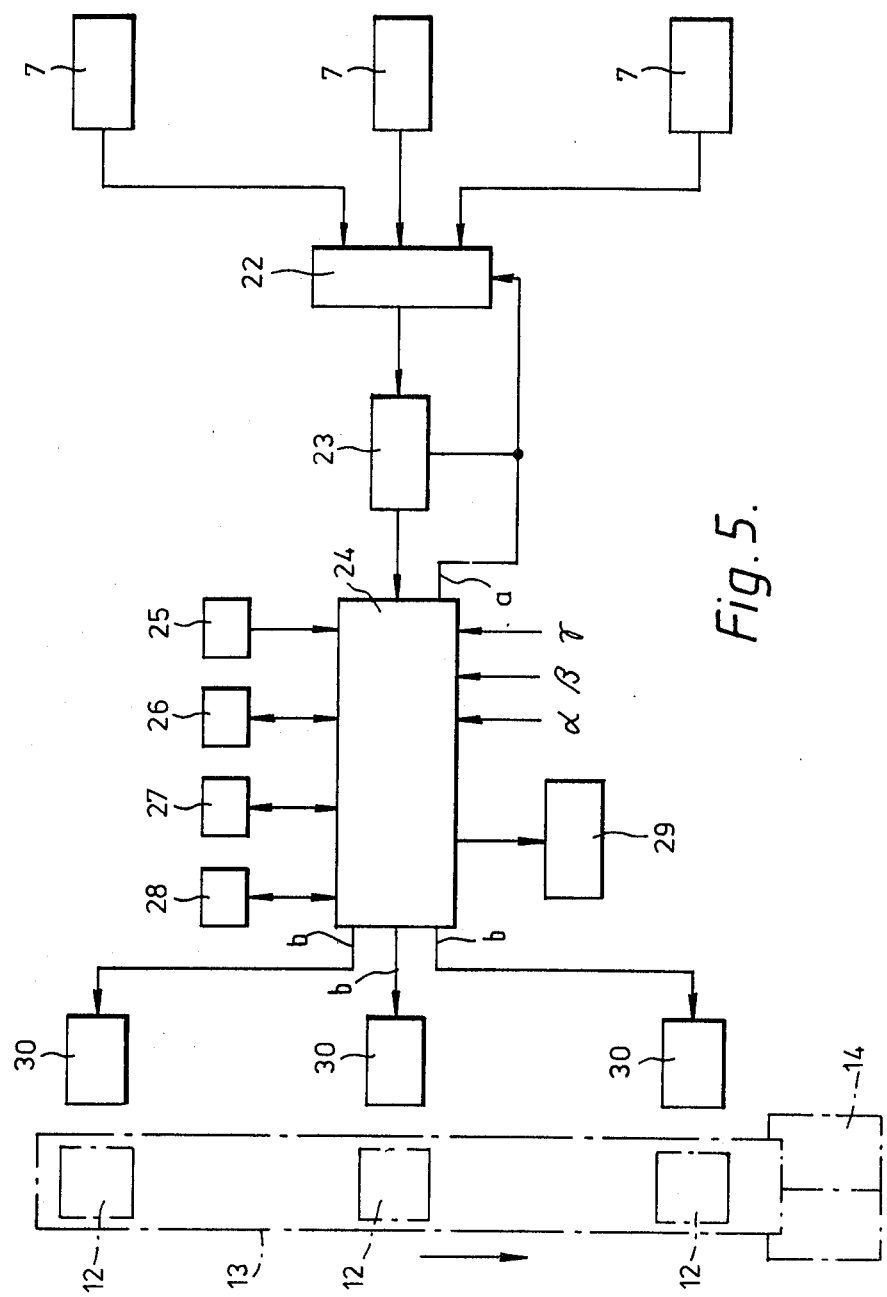
FIG. 5 is a block diagram of electronic circuitry for the weighing apparatus shown in FIG. 1.

The arrangement of the electronic circuitry of this invention will now be described with reference to FIG. 5. In addition, the parts of the individual lines having the same construction are given the same reference character. The numeral 22 denotes an input selector; 23 denotes an A/D converter; and 24 denotes a microcomputer (hereinafter referred to as CPU). In response to control signals a from the CPU 24, analog weight signals from the weighing unit 7 are successively transferred from the input selector 22 one by one to the A/D converter 23, where they are converted into digital signals, which are then transferred to the CPU 24. The CPU receives a computation command signal $\alpha$, a bucket detection signal $\beta$ and a tare storage signal $\gamma$ to control said input selector 22 and A/D converter 23 and perform tare subtractions, combinational computations and control of the tipping of buckets 5. The numeral 25 denotes a program storing section for storing programs for operation of the CPU 24; 26 denotes a tare storing section for storing the respective weights of the buckets 5 as tares; 27 denotes a net weight storing section for storing the weight of objects to be weighed; 28 denotes an optimum combination storing section for storing a preset weight value or a value nearest thereto, i.e., an optimum combination at the end of combinational operation; and 29 denotes an indicating section for indicating the weight of objects being weighed, the preset weight value and the deviation of the total of the weights corresponding to the optimum combination. All these sections are connected to the CPU 24. The numeral 30 denotes discharge drive sections each for driving the bucket tipping mechanism (not shown) which tips buckets 5 in the associated line when necessary, the arrangement being such that when a bucket 5 selected for combination reaches the discharge chute 12, a discharge command signal b from the CPU 24 actuates the bucket tipping mechanism to tip the bucket 5 so as to discharge the objects therein into the discharge chute 12.

The function of the embodiment arranged in the manner described above is as follows.

First, the bucket conveyor 1 of each line is driven through one cycle so that the respective weights of the buckets 5 are successively measured by the associated weighing unit 7. Prior to this bucket weight measurement, the computation command signal $\alpha$ and tare storage command signal $\gamma$ have been inputted into the CPU 24. The respective weights of the buckets 5 are successively transferred in the form of an analog signal from the associated weighing unit 7 to the input selector 22, from which said analog weight signals from the weighing unit 7 are then transferred one by one to the A/D converter 23 in response to control signals a from the CPU 24. The transferred weight signals are converted into digital signals by the A/D converter 23 and then transferred to the CPU 24. Since the tare storage command signals $\gamma$ have been inputted in the CPU 24, the respective weights of the buckets 5 are stored as tares in the tare storage section 26. When the weights of all of the buckets 5 have been stored in the storage section 26, the tare storage command signals $\gamma$ stored in the CPU 24 are automatically or manually released and then the bucket conveyor 1 is continuously driven while objects to be weighed are automatically or manually put successively into the buckets 5 moving on the conveyor 1. Buckets 5 which have said objects put therein are transferred along the lower run of the conveyor toward the weighing unit 7.

The buckets 5 are successively placed on the weighing pan 9 of the weighing unit 7 in the following manner. Thus, as shown in FIGS. 3 and 4, until the bucket 5 reaches the sprocket wheels 10, it is attached to the attaching shafts 15 with the attaching elements 16 fixed to the roller chains 4 being held vertical (see FIG. 2), and in this state the attaching elements 16 turn counterclockwise through 90° along the sprocket wheels 10 until they are horizontal, the path of travel of the attaching shafts 15 being indicated by the phantom line x. Therefore, the bucket 5, as attached to the attaching shafts 15, descends in its horizontal state until it sits on the weighing pan 9, when the attaching elements 16 become horizontal, the path of travel of the bucket shafts 18 being indicated by the phantom line x. As the roller chains 4 move along the peripheral surfaces 8' of the guide plates 8, the attaching elements 16 descend in their horizontal state and the weighing pan 9 supporting the bucket 5 also descends but slightly, with the attaching shafts 15 separating from the attaching brackets 20 and descending to the position of the lowest point of travel A. At this time, the attaching shafts 15 have been completely isolated from the attaching brackets 20, allowing the bucket 5 to be supported on the weighing pan 9. In this state, the bucket 5 is weighed. With the further travel of the roller chains 4, the attaching elements 16 half turn clockwise around the lowest point of travel A along the guide plates 8 to resume the horizontal state and ascend in their horizontal state until the attaching shafts 15 again engage the attaching brackets 20. Thus, the bucket 5 the weighing of which has just been completed is supported again by the roller chains 4 and the attaching elements 16 ascend in their horizontal state and hence the weighing pan 9 ascends back to its original position. The attaching elements 16 ascending in their horizontal state lift the bucket 5 to separate it from the weighing pan 9 and turn counterclockwise through 90° along the sprocket wheels 11 to resume the vertical state (see FIG. 2). The bucket 5 is then transferred to a position above the discharge chute 12.

In this way, the buckets 5 having objects to be weighed put therein are successively weighed simultaneously in all of the lines.

On the other hand, the measured weight values provided by the weighing unit 7 in each line are transferred to the input selector 22 as analog weight signals and then transferred one by one to the A/D converter 23 in response to control signals a. The weight signals thus transferred are converted into digital weight signals by the A/D converter 23 and then transferred to the CPU 24. The weight of the corresponding bucket 5 is read out of the tare storage section 26 in which the respective weights of the buckets 5 are stored, and it is transferred to the CPU 24, where the net weight of the objects in each bucket is computed by subtracting the weight of the bucket 5 from the weight value from the A/D converter 23. The net weight thus computed is stored in the net weight storage section 27.

The net weights of the objects in the respective buckets are successively computed and are stored in the net weight storage section 27 in groups each consisting of a predetermined number of, e.g., three net weights for each line. Thus, if there are 3 lines, a total of 9 weight values are used in the computation of a desired or predetermined number of combinations of such values which is performed in the CPU 24 and a particular combination of weight values which is equal or nearest to the present weight is selected. The selected combination is stored in the storage section 28. In addition, the preset weight, the net weight of the objects being weighed and the deviation of the total weight values corresponding to the optimum combination from the preset value are indicated in the indication section 29.

Buckets which have undergone weighing are successively conveyed and when they reach a position above the discharge chute 12, they are detected by a detector (not shown) and bucket detection signals β for each line are fed to the CPU 24. The CPU 24 judges whether or not such a signal β corresponds to the signal associated with a bucket 5 corresponding to the combination stored in the optimum combination storage section 28 and if it does, the CPU 24 sends a discharge command signal b to the discharge drive section 30, with the result that the bucket tipping mechanism (not shown) is actuated to tip the corresponding bucket 5 to discharge the content thereof into the discharge chute 12. The objects discharged from the respective buckets corresponding to the combination stored in the optimum combination storage section 28 are collected in the timing hopper 14 by the collecting conveyor 13 and supplied to a packaging machine or the like (not shown). The buckets 5 emptied of their contents travel on the upper run of the bucket conveyor 1, during which objects to be weighed are put again into them manually or automatically.

On the other hand, if the bucket detection signal β is judged not to correspond to the signal associated with the bucket corresponding to the combination stored in the optimum combination storage section 28, no discharge command signal b is sent from the CPU 24, so that the bucket 5 is not tipped and is conveyed together with its content to the upper run of the bucket conveyor 1 and weighed again by the weighing unit 7 and the net weight value of the objects therein is used in other combinational computations.

In addition, the number of buckets 5 in each line is a multiple of the number of weight values used in combinational computations for each line, plus or minus 1. For example, in the illustrated embodiment, since the number of lines is 3 and since 3 weight values are used in each line, the number of buckets 5 in each line is, e.g., 16. This measure prevents the same buckets 5 from being used in combinational computations. Further, while the number of buckets 5 present between the weighing unit 7 and the discharge chute 12 is equal to the number of weight values used for combinational computations in the illustrated embodiment, more buckets may be present. In that case, the capacity of the net weight storage section 27 must be increased. Further, in the illustrated embodiment, combinational computations are performed with 3 weight values in each line, namely, 9 weight values in total, but the number is not limited thereto; for example, the number of lines may be 4, and 2 weight values for each line and hence 8 weight values in total may be used to perform combinational computations. Thus, the number of weight values may be determined according to the need. Further, while the collecting conveyor 13 has been used to collect at a place the objects discharged from the respective lines, such a conveyor may not be used and instead the discharge chute 12 of each line may be extended to a position above the timing hopper 14. Further, the means for placing the buckets 5 on the weighing unit 7 is not limited to the illustrated guide plates 8 and sprocket wheels 10, 11. Further, the conveyors 1 may be either continuously or intermittently driven, but continuous drive is more preferable in consideration of impacts due to a repetition of stoppage.

What is claimed is:

1. A weighing apparatus comprising a plurality of transfer and weighing lines each consisting of a bucket conveyor having a plurality of buckets for transferring objects to be weighed, and a weighing unit for weighing the buckets with objects held therein, said apparatus being adapted to drive the bucket conveyors to successively weigh the object held in the buckets, store a predetermined number of measured weight values of the objects for each line, and compute a desired or predetermined number of combinations of the stored weight values to obtain a combination which provides a preset weight or a value nearest thereto.

2. A weighing apparatus comprising a plurality of transfer and weighing lines each comprising means for transferring objects to be weighed and means for weighing said objects on the way of transfer, means for storing a predetermined number of weight values of the objects thus measured for each line, and means for performing a desired or predetermined number of combinational computations of measured weight values and judging the combinations to pick out one equal or nearest to the preset weight.

3. A weighing apparatus as set forth in claim 2, wherein said bucket conveyor includes driving and driven sprocket wheels, roller chains extending between and entrained around said sprocket wheels, and means for driving said driving sprocket wheels, each of said roller chains having a plurality of brackets arranged at predetermined intervals of space along said roller chain, and horizontally extending attaching shafts fixed to said brackets through attaching elements, each of said buckets having horizontally projecting bucket shafts, and attaching brackets having an inverted U-shaped elongated hole for receiving said attaching shaft.

4. A weighing apparatus as set forth in claim 2, wherein said transferring means is a bucket conveyor which transfers a plurality of buckets for holding objects to be weighed from a charging section where said objects are charged into said buckets to a weighing section having a weighing unit and a device for placing said buckets on said weighing unit and thereafter to a discharge section having a device for tilting the buckets to discharge the objects therein.

5. A weighing apparatus as set forth in claim 4, wherein said bucket conveyor transfer the buckets in a circulatory manner from said charging section to said weighing section and then to said discharge section, and said discharge device selectively operates in response to an external signal.

6. A weighing apparatus as set forth in claim 5, including means for imparting said signal to the discharge device only with respect to buckets which correspond to the combination equal or nearest to the preset weight, wherein the objects held in the buckets not corresponding to said combination are allowed to take part in other combinations.

7. A weighing method which comprises providing a plurality of transfer and weighing lines each consisting of a bucket conveyor having a plurality of buckets for transferring objects to be weighed, and a weighing unit for weighing the buckets with the objects held therein, driving the bucket conveyor to successively weigh the objects in the buckets, storing a predetermined number of measured weight values of the objects for each transfer and weighing line, performing a desired or predetermined number of combinational computations of a plurality of stored weight values so as to obtain a combination equal or nearest to the preset weight.

8. A weighing apparatus comprising a plurality of transfer and weighing lines each comprising means for transferring objects to be weighed and means for weighing said objects on the way of transfer, means for storing a predetermined number of weigh values of the objects thus measured for each line, and means for performing a desired or predetermined number of combinational computations of measured weight values and judging the combinations to pick out one equal or nearest to the preset weight, wherein said bucket conveyor includes driving and driven sprocket wheels, roller chains extending between and entrained around said sprocket wheels, and means for driving said driving sprocket wheels, each of said roller chains having a plurality of brackets arranged at predetermined intervals of space along said roller chain, and horizontally extending attaching shafts fixed to said brackets through attaching elements, each of said buckets having horizontally projecting bucket shafts, and attaching brackets having an inverted U-shaped elongated hole for receiving said attaching shaft, and wherein said means for placing the buckets on the weighing pan of the weighing unit includes a guide plate lying in the same vertical plane as that in which the roller chain travels, and a pair of sprocket wheels disposed on both sides of said guide plate and aligned with the latter in the direction of travel of said roller chain, said guide plate having a guide surface in the form of a circular arc on the end thereof, the arrangement being such that the roller chain travels from one of said pair of sprocket wheels via said guide surface to the other, during which travel the bucket vertically descends and is temporarily disengaged from the roller chains and supported on the weighing pan of the weighing unit.

* * * * *